United States Patent
Lenive

(10) Patent No.: US 9,008,573 B2
(45) Date of Patent: Apr. 14, 2015

(54) METHODS AND APPARATUS FOR A MULTI-POLARIZED WIRELESS COMMUNICATIONS SYSTEM

(71) Applicant: Cambridge Silicon Radio Limited, Cambridge (GB)

(72) Inventor: Vlad Lenive, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 42 days.

(21) Appl. No.: 14/014,191

(22) Filed: Aug. 29, 2013

(65) Prior Publication Data
US 2015/0065034 A1   Mar. 5, 2015

(51) Int. Cl.
*H04B 7/24*   (2006.01)
*H04B 7/08*   (2006.01)

(52) U.S. Cl.
CPC .................... *H04B 7/0871* (2013.01)

(58) Field of Classification Search
CPC .... H04B 10/532; H04B 10/40; H04B 10/516; H04B 10/50; H04W 24/00; H04W 16/00
USPC ................................... 455/39, 575.7
See application file for complete search history.

(56) References Cited

U.S. PATENT DOCUMENTS

| | | | | |
|---|---|---|---|---|
| 7,315,563 B2* | 1/2008 | Smith et al. | ................... | 375/130 |
| 8,582,687 B2* | 11/2013 | Terry | ............................. | 375/296 |
| 2005/0064825 A1* | 3/2005 | Forrester | ....................... | 455/101 |
| 2007/0071137 A1* | 3/2007 | McCorkle | ...................... | 375/332 |
| 2009/0286474 A1* | 11/2009 | Park et al. | ........................ | 455/20 |

* cited by examiner

*Primary Examiner* — April G Gonzales
(74) *Attorney, Agent, or Firm* — Vorys, Sater, Seymour and Pease LLP; Vincent M DeLuca

(57) ABSTRACT

Signal processing methods and apparatus are disclosed, including a method of receiving a signal using at least first and second antennas, the method comprising obtaining a first signal comprising a component of the received signal received at said first antenna, obtaining a second signal comprising a component of the received signal received at said second antenna, wherein the first and second signals comprise at least partially orthogonal components of the received signal, performing operations on said first signal and said second signal to obtain first and second modified signals, wherein the operations substantially maximize a level of the received signal in the first modified signal and substantially minimize a level of the received signal in the second modified signal, and processing the first modified signal.

27 Claims, 4 Drawing Sheets

METHODS AND APPARATUS FOR A MULTI-POLARIZED WIRELESS COMMUNICATIONS SYSTEM

FIELD

Embodiments of this invention relate to signal processing methods and apparatus, for example to mitigate for and/or take advantage of the effects of polarization of a signal to be received and processed.

BACKGROUND

A wireless link between a transmitter and a receiver includes an antenna at the receiver for receiving a wireless signal from the transmitter. Generally, an assumption is made that the polarization of the field is optimum: that is, the characteristic polarization of the antenna and the signal being received are the same. If the signal is polarized differently from the antenna then the received signal power available at the antenna terminals will be less than maximum that is obtainable from the signal by the antenna. Losses resulting from polarization mismatch between the signal at the receiver and the antenna can have any value between infinity (in practice >40 dB) and zero. For example, where the antenna is vertical linear polarized (i.e. it expects to receive a vertical linear polarized signal) the losses due to polarization mismatch between the antenna and the actual signal can be 0 dB where the signal is vertical linear polarized, 3 dB where the signal is 45-degree slant linear polarized or left- or right-hand circular polarized, or up to infinity where the signal is horizontal linear polarized. Other polarizations of the antenna and/or signal may lead to other levels of losses due to polarization mismatch.

The polarization of the antenna of the receiver may also depend not only on the design of the receiver but also how the receiver or its antenna is physically aligned by a user. For example, the user may move the receiving apparatus in such a way that changes the polarization state of the receiving antenna.

The polarization state of the signal at the receiver can depend on the polarization of the antenna used by the transmitter to transmit the signal, and also may depend on properties of the propagation channel that may change the polarization state of the signal before it reaches the receiver. Generally, the signal once it reaches the receiver may have any arbitrary elliptical polarization state. Circular and linear polarization states are certain cases of elliptical polarization.

SUMMARY OF THE INVENTION

According to a first aspect of the invention, there is provided a method of receiving a signal using at least first and second antennas, the method comprising obtaining a first signal comprising a component of the received signal received at said first antenna, obtaining a second signal comprising a component of the received signal received at said second antenna, wherein the first and second signals comprise at least partially orthogonal components of the received signal, performing operations on said first signal and said second signal to obtain first and second modified signals, wherein the operations substantially maximise a level of the received signal in the first modified signal and substantially minimise a level of the received signal in the second modified signal, and processing the first modified signal. Processing the first modified signal may comprise, for example, extracting data from the modified signal, the data being that which was transmitted in the signal.

According to a second aspect of embodiments of the invention, there is provided apparatus for receiving a signal, the apparatus comprising at least first and second antennas, a first receiver adapted to provide a first signal comprising a component of the received signal received at said first antenna, a second receiver adapted to provide a second signal comprising a component of the received signal received at said second antenna, wherein the first and second signals comprise at least partially orthogonal components of the received signal, a first processing component adapted to perform operations on said first signal and said second signal to obtain first and second modified signals, wherein the first processing component is adapted to perform the operations to substantially maximise a level of the received signal in the first modified signal and substantially minimise a level of the received signal in the second modified signal, and a second processing component adapted to process the first modified signal.

According to a third aspect of embodiments of the invention, there is provided a transmitter comprising transmitting apparatus arranged to transmit a communications signal to a receiver, receiving apparatus arranged to receive information on a polarization of an interference signal, and polarization apparatus arranged to select a polarization for the communications signal to be at least partially orthogonal to the polarization of the interference signal.

BRIEF DESCRIPTION OF THE FIGURES

Embodiments of the invention will now be described by way of example only with reference to the accompanying Figures, in which.

DETAILED DESCRIPTION OF THE INVENTION

Embodiments of the invention as described herein include methods and apparatus for receiving a signal. Multiple antennas are used, and processing of the received signal may take place that, for example, effectively converts the arbitrary elliptical polarization of the received signal to a linear polarized signal. Furthermore, processing may effectively rotate the received signal to be substantially contained within a single sample stream, as if the signal were parallel to one of the receiving antennas. This can be done without any polarization adjustment or any other mechanical adjustment of the receiving antennas. Embodiments of the invention can be applied to various wireless communication schemes and standards including, for example, 802.11 standards, or MIMO communication schemes that may be part of 802.11n and 802.11ac standards.

Embodiments of the invention may also allow a transmitter to adapt a polarization state of a transmitted signal to be at least partially or completely orthogonal to an interference signal. The interference signal may comprise, for example, a signal intended for another receiving apparatus or a signal intended for the same receiving apparatus but relating to a different channel. Embodiments of the invention may allow the transmitted signal to be received by a receiver with reduced or minimal losses due to polarization mismatch between the signal at the receiver and any of the receiving antennas, or even complete elimination of such losses. Additionally or alternatively, the receiving apparatus may in some embodiments process the signal to produce first and second modified signals in such a manner that the transmitted signal relating to a first channel is maximised in the first modified signal and minimised in the second modified signal, and the signal relating to a second channel may be maximised in the second modified signal and minimised in the first modified signal. In this way the first and second modified signals can be processed individually to for example extract data relating to first and second channels respectively.

Figure 1:
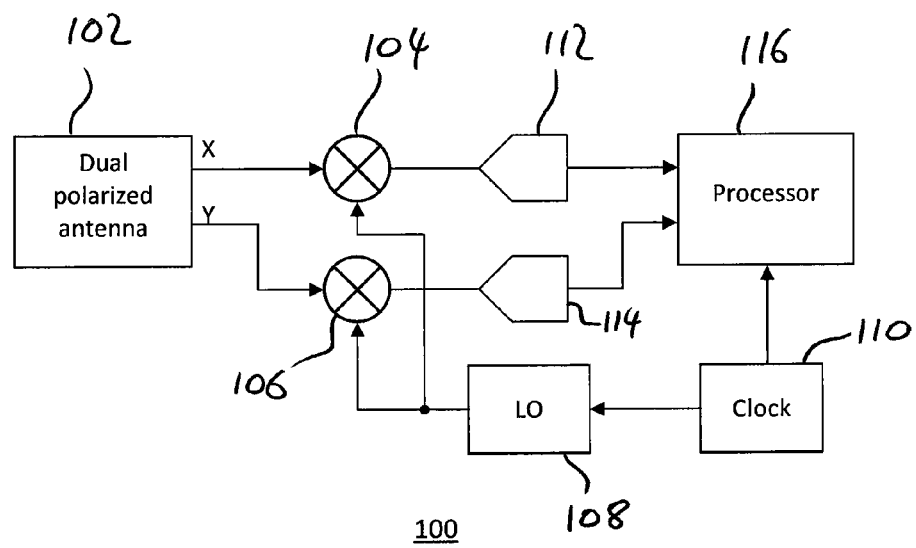
FIG. 1 shows a receiving apparatus according to a first embodiment of the invention.

FIG. 1 shows an example of receiving apparatus 100 according to embodiments of the invention. The receiving apparatus 100 includes a dual polarized antenna that includes a first antenna and a second antenna that is orthogonal to the first antenna. That is, the first antenna is aligned to a first polarization state, and the second antenna is aligned to a second polarization state that is orthogonal to the first polarization state. For example, where the antennas are aligned to receive linear polarized waves, in a three-dimensional space the first and second antennas may be considered to lie on the X and Y axis, respectively, and receive signal components moving in a direction parallel to the Z-axis. In alternative embodiments, however, the antennas may be adapted to receive circular polarized waves or elliptically polarized waves. Additionally or alternatively, in other embodiments, the first and second antennas may be only partially orthogonal or not at all orthogonal. Where the antennas are not orthogonal, and optionally where the antennas are only partially orthogonal, additional apparatus (not shown) may be provided to ensure that the antennas output at least partially orthogonal components of a received signal. For example, the antenna 102 may include polarizers and/or may be surrounded by material that is not isotropic.

The dual polarized antenna 102 provides a first output connected to a first mixer 104. The first output corresponds to the output of the first antenna. Similarly a second output of the dual polarized antenna 102 is connected to a second mixer 106. A local oscillator 108, controlled by a clock 110, provides a local oscillator signal to the mixers 104 and 106 to convert the received radio frequency (RF) signals to an intermediate frequency (IF).

The output of the first mixer 104 is provided to a first analog to digital converter (ADC) 112. The first ADC provides a first sample stream of digital samples of the IF signal from the first mixer 104. Thus, the first sample stream relates to the signal received at the first antenna of the dual polarized antenna 102. Similarly, the output of the second mixer is provided to a second ADC 114, which provides a second sample stream of the IF signal from the second antenna. The first and second sample streams are provided to a processor 116, which also receives the clock signal 110, though in other embodiments this may be a different clock signal to that provided to the local oscillator 108. The processor has a data output 118 that may provide data extracted from the signal received by the dual polarized antenna 102.

Each of the samples in the sample streams may be an indication of the energy level of the component of the signal received by the associated antenna.

The processor 116 performs operations on the first and second sample streams from the ADCs to obtain first and second modified sample streams, wherein the operations substantially maximise a level of the received signal in the first modified sample stream and substantially minimise a level of the received signal in the second modified sample stream. Effectively, for example, the operations combine the components of the received signal as provided by the orthogonal antennas in such a manner so that they are combined into a single sample stream (or, in alternative embodiments that are partially or fully implemented using analog components, a single signal).

Figure 2:
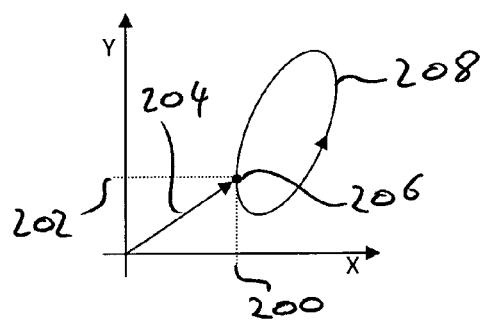
FIG. 2 shows an example of a polarization state of a received signal.

FIG. 2 shows an example of a left-hand elliptically polarized received signal. FIG. 2 shows X and Y axes, which may for example in some embodiments be regarded as being parallel to orthogonal antennas used to receive the signal. Particularly, for example, the X-axis could be regarded as being parallel to a first linear polarized antenna and the Y-axis could be regarded as being parallel to a second linear polarized antenna, orthogonal to the first antenna. The signal to be received is propagating along a direction parallel to the Z-axis, for example into the page. At an instant in time, a sample of the received signal may be obtained from each of the antennas—for example, from the output of the mixers 104, 106 or the ADCs 112, 114 shown in FIG. 1. Thus, for example, an antenna parallel to the X-axis may provide a sample 200 and an antenna parallel to the Y-axis may provide a sample 202. The samples 200 and 202 may be regarded as a sample vector 204 that points to a received signal sample 206 that lies on an ellipse 208 describing the elliptical polarization state of the signal. As further sample vectors are taken over time with an appropriate sample rate, the sample point 206 will move around the ellipse 208 if the polarization state of the received signal does not change.

Figure 3:
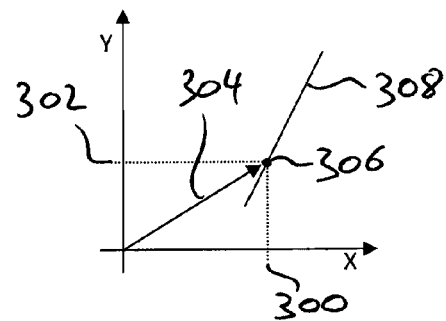
FIG. 3 shows an example of a polarization state of a modified signal.

A first operation performed by the processor 116 may be to effectively convert the elliptically polarized received signal (as represented by the sample vector 204 shown in FIG. 2) into a substantially linear polarized signal. For example, an operation is performed by the processor such that instead of moving around an ellipse, a modified sample point instead moves along a substantially straight line. FIG. 3 shows a modified X-axis sample 300 and a modified Y-axis sample 302 forming a modified sample vector 304 indicating a modified sample point 306. With further samples over time similarly modified, the sample point moves along a substantially straight line 308. It is noted that this does not take into account noise or interference, which may cause the sample point to deviate from the ellipse 208 shown in FIG. 2 and/or the straight line 308 shown in FIG. 3.

In some embodiments, the first operation may be performed by adjusting the relative phase of sample streams that are provided by the ADCs 112 and 114 shown in FIG. 1. In other embodiments, the relative phase may be adjusted in the analog domain, for example by adjusting the relative phase of analog signals representing the signal level from the associated antenna. In embodiments that convert a received signal to IF, the relative phase adjustment can be implemented before or after the IF conversion.

One example of an operation to convert the elliptical polarization into a substantially linear polarization is to multiply the sample vector by the following matrix L1:

$$L1 = \begin{pmatrix} e^{j\delta/2} & 0 \\ 0 & e^{-j\delta/2} \end{pmatrix} \quad (1)$$

With appropriate selection of the parameter δ, the elliptical polarization of the received signal can be modified to effectively be a substantially linear polarization, i.e. the sample vector can be modified such that is lies upon a substantially straight line as shown in FIG. 3. The sample vector may be described by, for example, a first modified signal indicating X-components of the modified sample vector and a second modified signal indicating Y-components of the modified sample vector. In some implementations, the conversion operation described above may be implemented by a relative phase shift between the first and second sample streams from the ADCs 112 and 114. For example, the output of the ADC 112 may be delayed relative to the output of the ADC 114, or vice versa. The processor 116 may include or have access to storage (not shown) to store past samples from the ADC 112 and/or ADC 114 and the processor may refer to these past samples to implement the phase shift between the sample streams.

A second operation performed by the processor 116 may be to effectively rotate the linear polarization shown in FIG. 3 to be substantially parallel to one of the X-axis and the Y-axis. For example, the rotation may rotate the linear polarization to be parallel to the X-axis. As a result, a Y-component of the modified sample vector may be substantially constant, zero, or close to zero. For example the Y-component may be minimised, though some residual signal or noise may be present in the Y-component. The X-component would be maximised, for example all of the received signal energy would be effectively transferred to the X-component of the modified sample vector.

An example of the second operation may be to multiply the modified sample streams (or a vector comprising a sample from each of the modified sample streams) by the matrix L2:

$$L2 = \begin{pmatrix} \cos\theta & -\sin\theta \\ \sin\theta & \cos\theta \end{pmatrix} \quad (2)$$

Appropriate selection of the parameter θ will rotate the modified sample vector to be parallel to the X-axis.

As a result of these operations, substantially all of the signal energy is transformed to be contained within the X-component of the modified sample vector, and hence the X-component can be processed to extract data from the received signal. As substantially none of the signal energy is contained within the Y-component of the received signal, the Y-component can be discarded.

Thus the received signal can have any arbitrary elliptical polarization state, and operations may be performed to transform substantially all of the signal energy received by two antennas into a single sample stream for subsequent processing. As a result, losses due to mismatch between the signal and any of the antennas are greatly reduced, or substantially or completely eliminated.

The above example of two operations can be performed in either order, and in some embodiments also before, after or at the same time as other operations performed on the signals provided by the antennas. The operations may also be combined into a single operation using a single linear operator L where, for example:

$$L(\delta,\theta) = L2 \times L1 \quad (3)$$

The parameters δ and θ can be chosen to maximise the signal level (e.g. the signal energy) along a chosen axis, such as the X-axis for example. In one example, the value of δ can range from 0 to π, and the value of θ can range from 0 to 2π. Multiplication of a sample vector, for example, by the linear operator L may convert the effectively elliptically polarized received signal into a signal that is substantially aligned with one of the X- and Y-axis. It is noted that the orthogonal X- and Y-axis are merely an example of a coordinate space and other coordinate spaces may be used in alternative embodiments.

Embodiments of the invention select the appropriate values of the parameters δ and/or θ. One example of selection of appropriate values by a receiving apparatus is as follows. For a received sample vector, i.e. a sample of the received signal from the first antenna and a sample of the received signal from the second antenna, the values of δ and θ are adjusted through predetermined ranges, for example the value of δ is adjusted through 0 to π, and the value of θ is adjusted through 0 to 2π. Other equivalent ranges could also be used, for example adjusting the value of θ from -π to π. The values of δ and θ that provide the maximum ratio of modified sample on the X-axis to modified sample on the Y-axis are chosen as the parameters. The larger of the two components (the X-component or the Y-component) can in some embodiments be chosen as the output of the process for further processing to extract transmitted data, for example, and the other (smaller) component can be discarded. In some embodiments, operations may be performed to maximise the signal in a predetermined one of the components, though in other embodiments the maximised component can be any of the components.

In other embodiments, the values for δ and θ are chosen over a number of samples gathered across a predetermined period of time. For example, a number of sample vectors are obtained and stored and subsequent processing of the stored samples is used to select appropriate values for δ and θ. For example, the values of δ and θ that give the maximum average ratio over the predetermined period are chosen.

The channel conditions between a transmitter of the signal and the receiving apparatus may change over time. Therefore, the parameters may be determined then fixed, determined then fixed for a period of time before being determined again, or continually updated.

Figure 4:
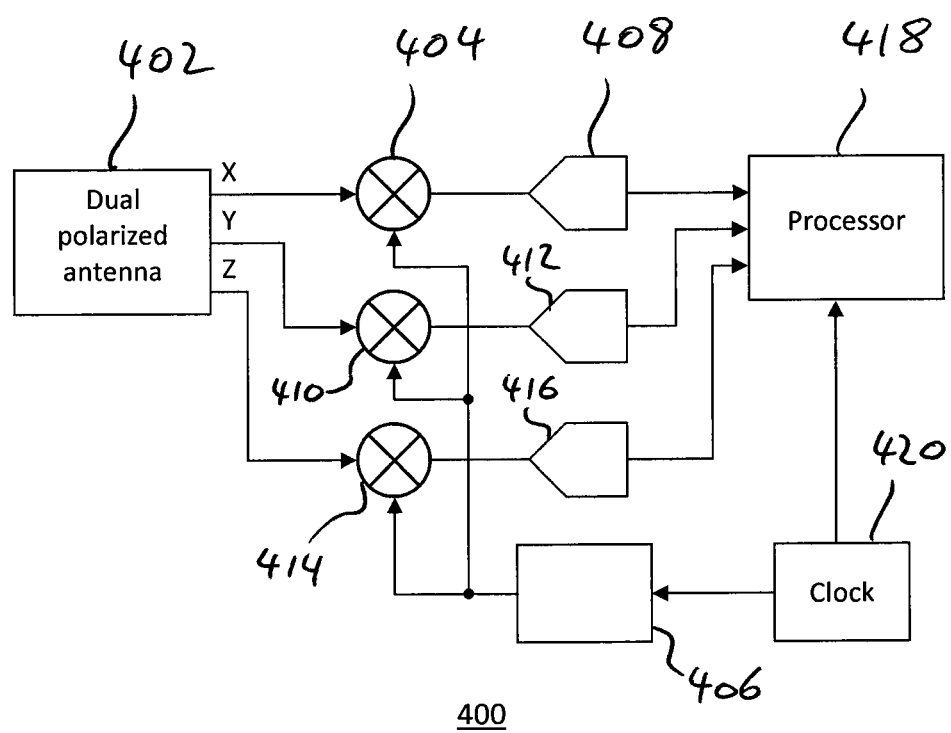
FIG. 4 shows a receiving apparatus according to a second embodiment of the invention.

FIG. 4 shows a further embodiment of receiving apparatus 400. The receiving apparatus 400 includes a triple polarized antenna 402 that includes first, second and third orthogonal antennas corresponding to, for example, X-, Y- and Z-axis respectively. The output of the first antenna is provided to a first mixer 404 which mixes the output of the first antenna with a signal from a local oscillator 406. The output of the first mixer 404 is provided to a first ADC 408. Similarly, the output of the second antenna is provided to a second mixer 410 which mixes the output of the second antenna with the local oscillator signal and provides its output to a second ADC 412. The output of the third antenna is provided to a third mixer 414 which mixes the output of the third antenna with the local oscillator signal and provides its output to a third ADC 416. The outputs of the ADCs are provided to a processor 418. A clock signal 420 is provided to the processor 418 and the local oscillator 406.

Operation of the receiving apparatus 400 is similar to that described above with reference to the receiving apparatus 100 shown in FIG. 1. For each antenna pair (for example, the first and second antennas, the second and third antennas, and the first and third antennas), the above described processing and operations are performed to maximise the received signal level substantially parallel to one of the X-, Y- and Z-axis (or, where another coordinate space is used, substantially parallel to one of the axes). As a result a signal can be received that is not propagating in a direction parallel to one of the antennas.

In the embodiments of the receiving apparatus shown in FIGS. 1 and 4, operations and processing are performed in the digital domain once the signal is converted to IF. However, in alternative embodiments more or less of the receiving apparatus, or alternative functions of the receiving apparatus, can be implemented in either the analog or the digital domain. For example, in some embodiments operations to substantially maximise a level of the signal in the first modified sample stream and substantially minimise a level of the signal in the second modified sample stream can be implemented in the analog domain before the ADCs, which for example sample modified signals from the antennas and mixers to provide modified sample streams.

In some embodiments, the receiving apparatus 100 or 400 is a part of an apparatus that can also transmit a signal, such as for example a mobile telephone. The apparatus may feed back to a transmitter (which may comprise, for example, a base station, wireless access point, mobile telephone or the like) the parameters δ and θ, or in other embodiments the parameters used in the operations to substantially maximise a level of the signal in the first modified signal and substantially minimise a level of the signal in the second modified signal. Such parameters may be used by the transmitter to determine the polarization state of a transmitted signal when it is received by the receiving apparatus, or at least the polarization state relative to the receiving apparatus. This information could be used by the transmitter to select an alternative polarization for a transmitted signal. For example, the transmitter may determine that the polarization state of the signal has significantly changed during propagation from the transmitter to the receiver due to channel conditions, and may select an alternative polarization state which may have improved propagation conditions. Additionally or alternatively, the transmitter may receive other information regarding the channel conditions between the transmitter and receiving apparatus and may select an alternative polarization to attempt to improve the channel conditions. In any case, the receiver may reliably receive the signal regardless of the polarization state of the originally transmitted signal, with little or no losses due to polarization mismatch.

In further embodiments, the transmitter may additionally or alternatively select a polarization state for the transmitted signal that is orthogonal to a polarization state of an interfering signal—for example, an interfering signal detected by the receiving apparatus and reported to the transmitter, an interfering signal otherwise reported to or detected by the transmitter, or an interfering signal transmitted by the transmitter itself (such as, for example, an alternative channel in a MIMO scheme or a signal transmitted to another receiving apparatus). In such embodiments, for example, a receiver may be able to perform operations to modify received sample vectors such that the intended signal is substantially maximised in one component and can be processed, whereas the interfering signal is maximised in the other component and can be discarded (or processed where it comprises a signal relating to another channel intended for the same receiving apparatus).

The embodiments described above relate to a receiving apparatus that has at least first and second orthogonal antennas. In other embodiments, the antennas may not be fully orthogonal, e.g. they may be partially orthogonal. Such embodiments may include antennas that are, for example, co-located in space and surrounded by substantially isotropic lossless dielectric. Additionally or alternatively, the antennas may be separated by a distance, in which case phase compensation may be performed on the signal from at least one of the antennas, and/or the antennas may be separated by a polarizing component. Therefore, for example, some embodiments may include antennas that are only partially orthogonal or not orthogonal, whereas the use of polarizers ensures that the antennas receive orthogonal or partially orthogonal components of the signal being received.

Figure 5:
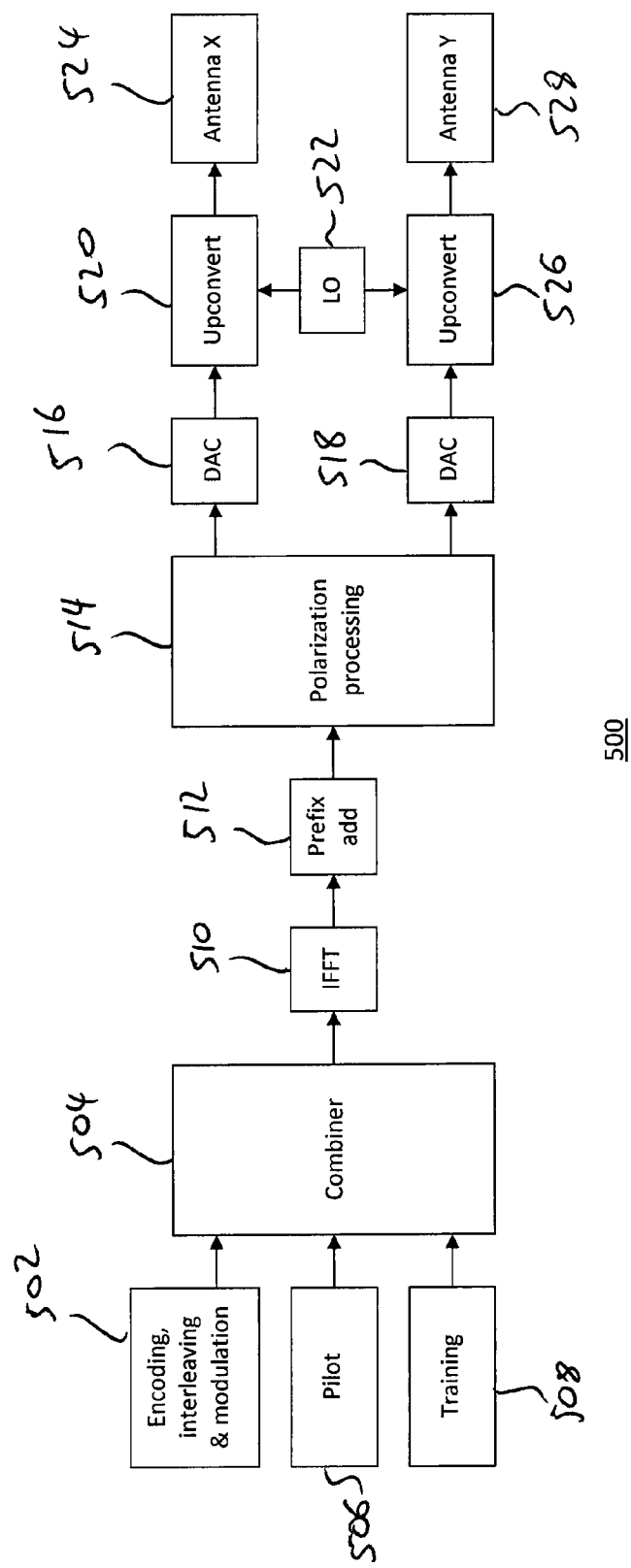
FIG. 5 shows a transmitting apparatus according to an embodiment of the invention.

FIG. 5 shows an embodiment of a transmitting apparatus 500. The transmitting apparatus 500 includes an encoding, interleaving and demodulating block 502 that receives data to be transmitted, encodes, interleaves and modulates the data according to selected schemes and provides the resulting complex symbols to a combiner 504, which combines the symbols with pilot symbols 506 and training symbols 508 into a frame in a known manner.

The symbols of the combined frame are provided to an inverse fast Fourier transform (IFFT) block 510 which performs the IFFT operation and provides the resulting symbols to a prefix add block 512 that adds a prefix to the frame in a known manner. The symbols of the frame are then passed to a polarization processing block 514. This block 514 selects a polarization state (PS) for the frame (or at least part of the frame) when it is transmitted. The polarization processing block 514 produces two channels that are passed to DACs 516 and 518 respectively. The output of DAC 516 is provided to a first upconverter 520 that uses a local oscillator (LO) signal 522 to upconvert the signal from the DAC 516 and provides the upconverted signal to a first antenna 524. Similarly, the output of DAC 518 is provided to a second upconverter 526 that provides an upconverted signal to a second antenna 528. The signal transmitted from antennas 524 and 528 may result in a signal being transmitted with a certain polarization state. For example, the polarization processing block 514 may adjust the relative amplitude and phase of the signals from the antennas 524 and 528 to select a polarization of the transmitted signal. For example, the antennas 524 and 528 may be partially or fully orthogonal and/or may be associated with polarizers and/or the like to produce signals that are partially or fully orthogonal.

Figure 6:
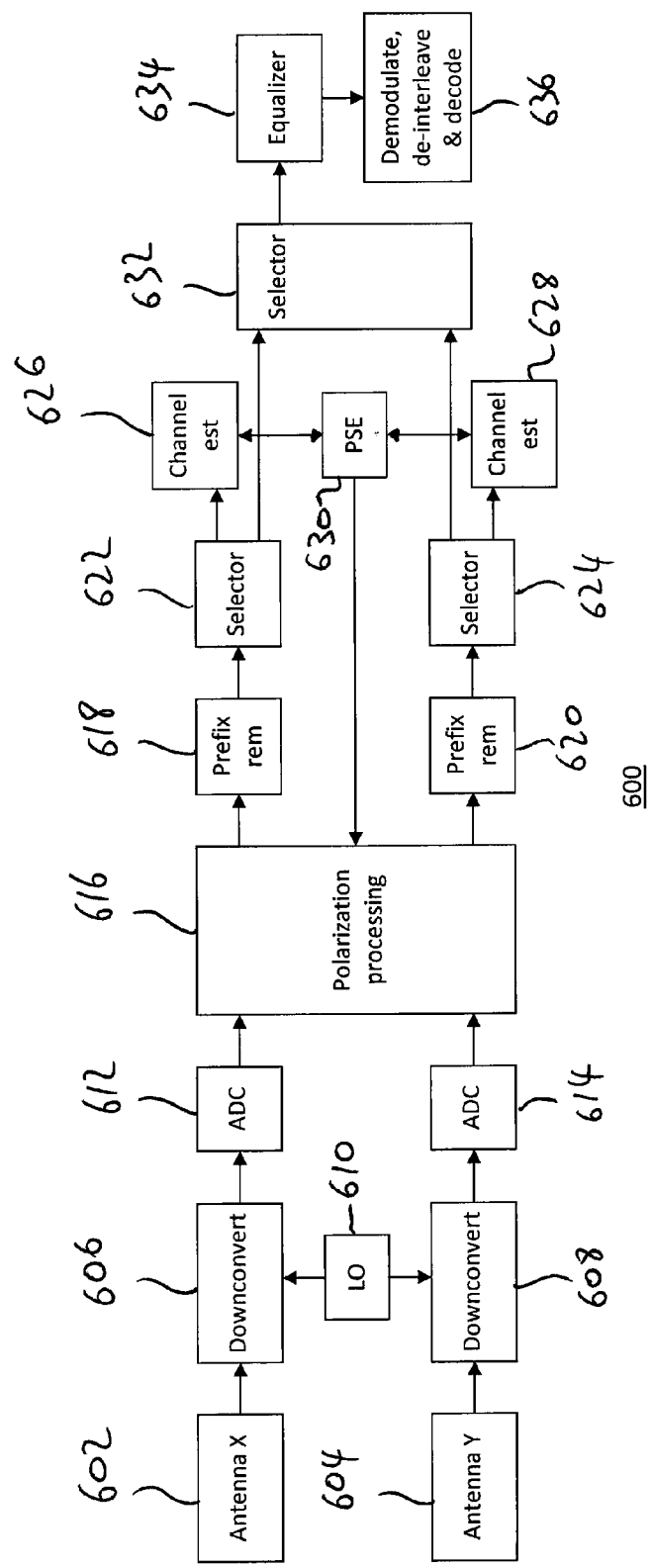
FIG. 6 shows a receiving apparatus according to another embodiment of the invention.

FIG. 6 shows a receiver 600 according to a further embodiment. The receiver 600 includes antennas 602 and 604 that are partially or fully orthogonal and/or are arranged (for example with polarizers and/or the like) such that at they respectively receive at least partially orthogonal signals. The outputs of the antennas are provided to respective downconverters 606 and 608 that downconvert the respective received signals to IF or baseband using a local oscillator signal 610. The downconverted signals are provided to respective ADCs 612 and 614. The outputs of the ADCs are provided to polarization processing block 616.

This block 616 may perform polarization processing on the signals from the ADCs 614 and 616. For example, the block 616 may perform operations on the signals from the ADCs to obtain first and second modified signals, wherein the operations substantially maximise a level of the received signal in a first modified signal and substantially minimise a level of the received signal in a second modified signal. The first and second modified signals are provided to respective prefix removing blocks 618 and 620 to remove the prefixes from a received frame, and then to respective selectors 622 and 624. The selector blocks 622 and 624 perform a fast Fourier transform (FFT) operation on the signals from the prefix removing blocks 618 and 620, and separate the pilot and training symbols from the data symbols in the resulting signals. The selector locks 624 pass the pilot and training symbols to respective channel estimator blocks 626 and 628, which use the pilot symbols and known training symbols to derive Channel State Information (CSI). The CSI from each selector block 622 and 624 is provided to polarization state estimate (PSE) block 630 which determines a PSE from the CSI information from the selector blocks 626 and 628. For example, the PSE block 630 determines a vector difference between the CSI from the selector blocks, this vector difference indicating amplitude and phase differences between the signals provided to the channel estimation blocks 626 and 628 and thus the amplitude and phase difference between the signals received by the antennas 602 and 604. The amplitude and phase differences, which indicate the polarization state of the received signal, are provided to the polarization processing block 616 which may use the amplitude and phase information to adjust operations that substantially maximise a level of the received signal in the first modified signal and substantially minimise a level of the received signal in the second modified signal. For example, the signal level of a signal provided to first prefix removing block 618 may be maximized, whereas the signal level of a signal provided to second prefix removing block 620 may be minimized for subsequently received signals or frames.

Suitable algorithms for channel state estimation to provide channel state information (CSI) are known to the skilled person and may include one or more of, for example, least-squares (LS), minimum mean square error (MMSE) and space-alternating generalized expectation-maximization (SAGE). Other algorithms may also be used that use only the pilot or training symbols, for example.

The channel estimator 626/628 and/or the phase state estimator 630 may use multiple symbols to produce channel state information or a phase state estimate. For example, the channel estimators 626 and 628 may average symbol information over multiple symbols in a frame and/or symbols from multiple frames. Similarly, in addition or alternatively, the phase state estimator 630 may use multiple channel state information, for example an average over part of a frame, a whole frame or multiple frames, to compute a phase state estimate.

The phase state estimator 630 may communicate with the channel estimators 626 and 628 in some embodiments. For example, the phase state estimate may be determined based on an iterative process in which the phase state estimator 630 communicates with one or both of the channel estimators 626 and 628.

The data symbols are provided by the selectors 622 and 624 to another selector block 632 which selects the output of one of the selectors 622 and 624 (for example the output associated with the maximized signal level) to provide to an equalizer 634 and then a demodulate, de-interleave and decode block 636 which determines the received data.

In some embodiments, a single prefix removing block 618 or 620, a single selector block 622 or 624 and/or a single channel estimation block 626 or 628 may be used for both signals provided by the polarization processing block 616, which may reduce the hardware, memory and/or processing requirements of the apparatus.

The apparatus shown in FIGS. 5 and 6 include two antennas, however more antennas (for example three) may be provided in either case to allow a full range of polarizations to be transmitted and/or received/detected.

What is claimed is:

1. A method of receiving a signal using at least first and second antennas, the method comprising:
   obtaining a first signal comprising a component of the received signal received at said first antenna;
   obtaining a second signal comprising a component of the received signal received at said second antenna, wherein the first and second signals comprise at least partially orthogonal components of the received signal;
   performing operations on said first signal and said second signal to obtain first and second modified signals, wherein the operations substantially maximise a level of the received signal in the first modified signal and substantially minimise a level of the received signal in the second modified signal; and
   processing the first modified signal.

2. The method of claim 1, comprising discarding the second modified signal.

3. The method of claim 1, wherein the operations include adjusting a relative phase of the first and second signals.

4. The method of claim 3, wherein the operations include rotating vectors comprising pairs of samples from the first and second signals.

5. The method of claim 1, wherein the operations include rotating vectors comprising pairs of samples from the first and second signals.

6. The method of claim 1, wherein the operations include multiplying vectors comprising pairs of samples from the first and second signals by the matrix $$\begin{pmatrix} e^{j\delta/2} & 0 \\ 0 & e^{-j\delta/2} \end{pmatrix}.$$

7. The method of claim 6, wherein the operations include multiplying vectors comprising pairs of samples from the first and second signals by the matrix $$\begin{pmatrix} \cos\theta & -\sin\theta \\ \sin\theta & \cos\theta \end{pmatrix}.$$

8. The method of claim 1, wherein the operations include multiplying vectors comprising pairs of samples from the first and second signals by the matrix $$\begin{pmatrix} \cos\theta & -\sin\theta \\ \sin\theta & \cos\theta \end{pmatrix}.$$

9. The method of claim 1, comprising performing the operations over a range of parameter values to determine the parameters that substantially maximise a level of the received signal in the first modified signal and/or substantially minimise a level of the received signal in the second modified signal.

10. The method of claim 1, wherein the received signal received at the antennas has an arbitrary elliptical polarization.

11. The method of claim 1, wherein obtaining the first signal comprises receiving a first sample stream from a first receiver connected to the first antenna, and obtaining the second signal comprises receiving a second sample stream from a second receiver connected to the first antenna.

12. The method of claim 1, comprising converting the received signal from radio frequency (RF) to intermediate frequency (IF).

13. The method of claim 1, comprising:
   obtaining a third signal comprising a component of the received signal received at a third antenna, wherein the third signal comprises a component of the received signal that is at least partially orthogonal to the components of the received signal in said first and second signals;

performing operations on said third signal and one of said first and second signals to obtain a third modified signal, wherein the operations substantially maximise a level of the received signal in one of the first and third modified signals, and substantially minimise a level of the received signal in the other of the first and third modified signals; and processing said one of the first and third modified signals.

14. Apparatus for receiving a signal, the apparatus comprising:

at least first and second antennas;

a first receiver adapted to provide a first signal comprising a component of the received signal received at said first antenna;

a second receiver adapted to provide a second signal comprising a component of the received signal received at said second antenna, wherein the first and second signals comprise at least partially orthogonal components of the received signal;

a first processing component adapted to perform operations on said first signal and said second signal to obtain first and second modified signals, wherein the first processing component is adapted to perform the operations to substantially maximise a level of the received signal in the first modified signal and substantially minimise a level of the received signal in the second modified signal; and a second processing component adapted to process the first modified signal.

15. The apparatus of claim 14, adapted to discard the second modified signal.

16. The apparatus of claim 14, wherein the operations performed by the first processing component include adjusting a relative phase of the first and second signals.

17. The apparatus of claim 16, wherein the operations performed by the first processing component include rotating vectors comprising pairs of samples from the first and second signals.

18. The apparatus of claim 14, wherein the operations performed by the first processing component include rotating vectors comprising pairs of samples from the first and second signals.

19. The apparatus of claim 14, wherein the operations performed by the first processing component include multiplying vectors comprising pairs of samples from the first and second signals by the matrix $$\begin{pmatrix} e^{j\delta/2} & 0 \\ 0 & e^{-j\delta/2} \end{pmatrix}.$$

20. The apparatus of claim 19, wherein the operations performed by the first processing component include multiplying vectors comprising pairs of samples from the first and second signals by the matrix $$\begin{pmatrix} \cos\theta & -\sin\theta \\ \sin\theta & \cos\theta \end{pmatrix}.$$

21. The apparatus of claim 14, wherein the operations performed by the first processing component include multiplying vectors comprising pairs of samples from the first and second signals by the matrix $$\begin{pmatrix} \cos\theta & -\sin\theta \\ \sin\theta & \cos\theta \end{pmatrix}.$$

22. The apparatus of claim 14, wherein the first processing component performs the operations over a range of parameter values to determine the parameters that substantially maximise a level of the received signal in the first modified signal and/or substantially minimise a level of the received signal in the second modified signal.

23. The apparatus of claim 14, wherein the received signal received at the antennas has an arbitrary elliptical polarization.

24. The apparatus of claim 14, wherein said first and second receivers convert the received signal from radio frequency (RF) to intermediate frequency (IF).

25. The apparatus of claim 14, comprising:

a third antenna;

a third receiver adapted to provide a third signal comprising a component of the received signal received at the third antenna, wherein the third signal comprises a component of the received signal that is at least partially orthogonal to the components of the received signal in said first and second signals;

a third processing component adapted to perform operations on said third signal and one of said first and second signals to obtain a third modified signal, wherein the third processing component is adapted to perform the operations to substantially maximise a level of the received signal in one of the first and third modified signals, and substantially minimise a level of the received signal in the other of the first and third modified signals; and a fourth processing component adapted to process said one of the first and third modified signals.

26. A transmitter comprising:

transmitting apparatus arranged to transmit a communications signal to a receiver;

receiving apparatus arranged to receive information on a polarization of an interference signal; and polarization apparatus arranged to select a polarization for the communications signal to be at least partially orthogonal to the polarization of the interference signal.

27. The transmitter of claim 26, wherein the receiving apparatus is arranged to receive the information from the receiver of the communications signal.

* * * * *